United States Patent [19]

Kromrey

[11] Patent Number: 4,894,190
[45] Date of Patent: Jan. 16, 1990

[54] STAGED PULTRUSION MOLDING OF COMPOSITES

[75] Inventor: Robert V. Kromrey, Campbell, Calif.

[73] Assignee: United Technologies Corporation, Hartford, Conn.

[21] Appl. No.: 248,673

[22] Filed: Sep. 26, 1988

[51] Int. Cl.[4] .......................................... B29C 35/10
[52] U.S. Cl. ...................................... 264/22; 264/37; 264/570; 264/DIG. 50; 264/347; 425/174.4
[58] Field of Search .................. 264/22, 37, 347, 570, 264/DIG. 50; 425/501, 502, 217, 174.4, 405.2, 405.1

[56] References Cited

U.S. PATENT DOCUMENTS

| | | | |
|---|---|---|---|
| 2,823,415 | 2/1958 | Martin et al. | 425/445 |
| 3,072,968 | 1/1963 | Watson et al. | 425/445 |
| 4,428,906 | 1/1984 | Rozmus | 425/405.1 |
| 4,547,337 | 10/1985 | Rozmus | 264/570 |
| 4,668,761 | 5/1987 | Aoshima et al. | 264/570 |
| 4,704,240 | 11/1987 | Reavely et al. | 425/389 |
| 4,720,368 | 1/1988 | Nakasone et al. | 425/445 |
| 4,724,123 | 2/1988 | Rozmus, Jr. | 264/570 |
| 4,755,341 | 7/1988 | Reavely et al. | 425/405.2 |
| 4,755,343 | 7/1988 | Kromrey | 264/570 |

FOREIGN PATENT DOCUMENTS

| | | | |
|---|---|---|---|
| 87639910 | 1/1987 | European Pat. Off. | |
| 62-225330 | 10/1987 | Japan | 425/405.1 |
| 866310 | 4/1961 | United Kingdom | 425/502 |
| 1546764 | 5/1979 | United Kingdom | 264/22 |

Primary Examiner—Jeffery Thurlow

[57] ABSTRACT

A continuous process method of molding composites. The method includes substantially filling a pressure chamber with a solid flowable polymer. The pressure chamber has a series of subchambers separated by a series of spaced apart baffles, but connected through baffle openings. A tube connects at least two subchambers, a transferring subchamber and a receiving subchamber. The polymer is displaced through the tube producing a polymer flow in the chamber through the baffle openings from the receiving subchamber to the transferring subchamber causing the receiving subchamber to have a higher pressure than the transferring subchamber. A composite precursor is passed through the pressure chamber by entering the precursor through the low pressure transferring subchamber wherein the composite precursor is exposed to pressure caused by the solid flowable polymer in order to cure the composite.

5 Claims, 1 Drawing Sheet

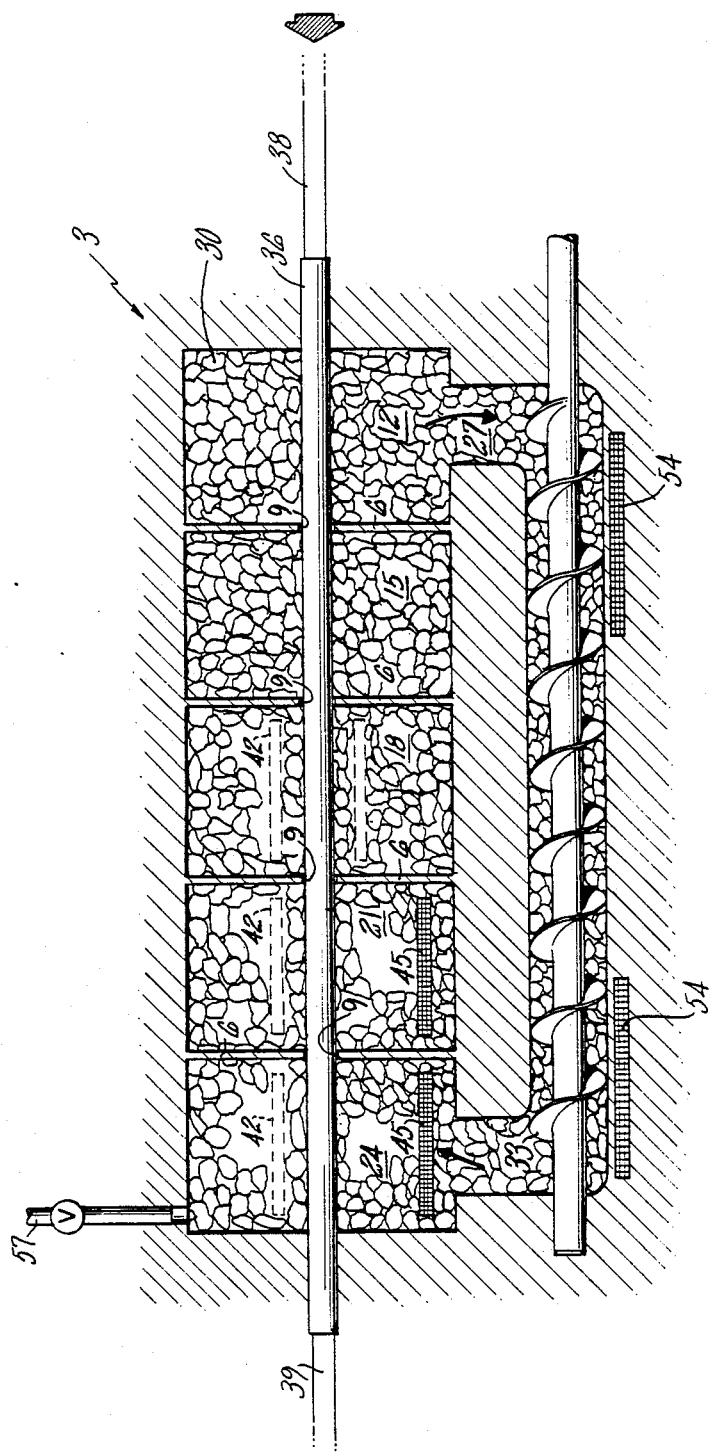

STAGED PULTRUSION MOLDING OF COMPOSITES

DESCRIPTION

1. Technical Field

The present invention relates to methods of molding polymeric containing articles under pressure.

2. Background Art

There are a variety of methods of molding articles. These include autoclaves, hydroclaves and compression molding. Particularly for high temperature molding (e.g., polyimide resins) one isostatic molding process has shown great advantage over other methods. This method is described in commonly assigned European Patent Application No. 87630010.4 entitled "Molding Method and Apparatus Using a Solid, Flowable, Polymer Medium" to Kromrey. An article is molded by contacting it with a solid polymer medium, such as an especially low strength unfilled silicone rubber which is solid and able to flow readily. Thermal expansion of the medium or mechanical force is used to create molding pressure and thereby provides a substantially uniform pressure on the article precursor. Various temperature and pressure cycles can be attained; constant high pressures can be maintained on the article precursor during cooldown, optionally aided by flowing of medium to and from a vessel in which the article precursor is being molded. The method is particularly adapted to molding filler or fiber reinforced thermosetting polymer composite articles.

Generally continuous process manufacturing methods are preferred over batch processes for their greater throughput. However continuous processes are typically more complex than batch processes. Although the above-described molding process using a solid flowable polymeric pressure transfer media provides many advantages it is described as a batch process.

Thus there is a need for continuous processes useful with molding methods using solid flowable polymer transfer media.

DISCLOSURE OF INVENTION

This invention is directed to a continuous process method of molding composites. The method comprises substantially filling a pressure chamber with a solid flowable polymer. The pressure chamber having a series of subchambers separated by a series of spaced apart baffles, but connected through baffle openings. A tube connects at least two subchambers, a transferring subchamber and a receiving subchamber. The polymer is displaced through the tube producing a polymer flow in the chamber through the baffle openings from the receiving subchamber to the transferring subchamber causing the receiving subchamber to have a higher pressure than the transferring subchamber. A composite precursor is passed through the pressure chamber by entering the precursor through the low pressure transferring subchamber wherein the composite precursor is exposed to pressure caused by the solid flowable polymer in order to cure the composite.

The foregoing and other features and advantages of the present invention will become more apparent from the following description (and drawings).

BRIEF DESCRIPTION OF DRAWINGS

The FIGURE illustrates an exemplary pressure chamber useful with the continuous process of this invention.

BEST MODE FOR CARRYING OUT THE INVENTION

According to the FIGURE, pressure chamber 3 has a plurality of baffles 6 having a desired thickness and holes 9 therein. Typically, the baffles 6 separate subchambers 12, 15, 18, 21 and 24 from each other except for fluid communication through holes 9. A conduit 27 connects transferring subchamber 12 and receiving subchamber 24 so that they are in fluid communication. A solid flowable polymer pressure transfer media 30 (described hereinafter) substantially fills the pressure chamber 3 and tube 27. A media transfer means such as a progressive screw conveyor 33 displaces the pressure transfer media 30 from subchamber 12 to subchamber 24. The screw 33 establishes a constant mass flow rate through the series of subchambers. Since the pressure drops across each opening 9, a pressure differential is established so that the pressure in each subchamber is lower than the pressure in the preceding subchamber. Thus, for example transferring subchamber 24 has a higher pressure than receiving subchamber 12. The individual pressure drops depend on a variety of factors (e.g., polymer viscosity, area of orifice baffle width) known to those skilled in the art.

Typically, a shape forming tube 36 is disposed through holes 9 and typically extends through the lower pressure subchambers. The desired length of the tube 36 depends on a variety of factors, such as the type of resin being cured, resin viscosity during the preforming operation, elapsed time needed for solidification, etc. The composition, strength, flexibility of the tube 36 may vary as desired. Typically, the tube 36 comprises an elastomeric or fluorocarbon polymer which will resist the operating temperatures encountered during resin cure. The tube 36 aids in forming, releasing and excluding the medium from entering the pultruded composite before it has sufficiently hardened.

A composite prepreg 38 passes into the pressure chamber 3 through tube 36 at the low pressure end (e.g. transferring subchamber) and is exposed to increasing pressure in the series of subchambers until it exits the pressure chamber 3 as a composite 39. This allows the composite prepreg 38 to be exposed to varying pressures in order to be compacted during conventional cure cycles. The pressures in the subchambers may be varied by changing flow rate, placement of the baffles 6, hole 9 sizes, length and size of the subchambers, etc. to achieve the desired pressure sequence. A vacuum line 57 may be used to evacuate volatiles from the chamber 3.

Typically during the cure cycle the composite prepreg is exposed to more than just pressure (e.g. U.V. radiation, heat, etc.) in order to cure the composite. Thus U.V. radiation 42 sources may be disposed in the chamber 3 (or outside the chamber) near where the composite prepreg 38 passes. As described hereinafter the pressure transfer media 30 may be substantially U.V. transparent under pressure allowing U.V. radiation to pass through the media 30 to the prepreg 38 in order to cure the prepreg 38.

Alternatively, the prepreg 38 may be exposed to heat for example using heating elements 45 and optionally including a thermally conductive type of pressure transfer media (described hereinafter). The heating elements 45 may be positioned to attain the desired cure cycle. The use of metal containing media is facilitated by the use of sufficient heating elements 45, 54 to maintain the media at a temperature sufficient so the media remains fluid (e.g., the metal doesn't chill to form a hard lattice and stop flowing).

A preferred pressure causing/transferring solid flowable media is described in European Patent Application No. 87630020.4 entitled "Molding Method and Apparatus Using a Solid, Flowable, Polymer Medium" by Kromrey, the disclosure of which is hereby incorporated by reference and in commonly assigned U.S. application Ser. No. 829,048 now abandoned, continuation Application Ser. No. 201,345 filed May 26, 1988 entitled "Molding Method and Apparatus Using a Solid Flowable, Polymer Medium", the disclosure of which is hereby incorporated by reference.

The medium's responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of −4+30 U.S. mesh sieve size (4.7-0.42 millimeter (mm)), which when pressurized, is sufficiently self-compliant to coalesce as an essentially void-free medium at a pressure of the order of 69 kPa (10 psi).

Typically, a silicone rubber is used as the pressurizing polymer. The preferred solid flowable polymer material is further described in U.S. Pat. No. 4,686,271 entitled "Hydraulic Silicone Crumb" by Beck et al, the disclosure of which is hereby incorporated by reference. The rubber is also an improvement on the type which is described in U.S. Pat. No. 3,843,601 to Bruner. See also U.S. Pat. No. 4,011,929 to Jeram et al. The disclosures of the above patents are hereby incorporated by reference. Generally, the preferred materials are dimethylsilicones that have vinyl groups. They may be produced by conventional commercial procedures, including production from polysiloxanes using various vulcanizing techniques. Preferred materials which have been used thus far are the experimental unfilled silicone rubber materials designated as X5-8017, formerly No. 6360 B1 (more simply 8017 hereinafter), X5-8023 and X5-8800 by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber Stauffer Chemical Company, Westport, Conn. USA), believed to be essentially the material which is described in the Bruner Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g., 316° C. (600° F.) 482° C. (900° F.)).

Most silicone rubbers are temperature limited for long term use, e.g., typically up to about 232° C. (450° F.). However, silicone resins of the vinylmethylsiloxane and silphenylene types have been successfully tested up to about 482° C. (900° F.). Fillers and other adulterants (such as the metal particulates described below) can be included with and within the medium, provided the essential behavior properties are maintained.

The perferred 8023 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also be observed that preferred polymer useful with the present invention forced through a small orifice, or through a 1.1 cm diameter pipe as described below, has a tendency to disintegrate into smaller particulate. By example, it is found that over time, a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32-64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. Because of this and their inherent resilience, a uniform hydraulic-like pressure is applied to the article precursor surface. Tests show that the 6360 material will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94-0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesc as an apparent void-free body below a pressure of 350 kPa, preferably 240 kPa; more preferably about 69 kPa.

Based on various molding tests and material property measurement, desirable results have been associated with medium having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer media may also incorporate thermally conductive particles to aid in heat transfer as described earlier.

The thermally conductive particulate additives, used to increase heat transfer within the polymer itself and to the article to be molded yet not detract from the polymer properties described below, comprise particulate metal. By thermally conductive is meant having a conductivity typical of metals and alloys which is greater than that of organic materials. By particulate is meant particles less than about 0.5 mm in size. These sizes enable the metal to mix with the polymer so as to provide a uniform mixture. This aids in increasing the heat transfer as the heat transferring metal is distributed throughout the mixture. It is especially preferred that the particulate metal is about 0.005 mm to about 0.5 mm. If the particles are below about 0.005 mm in size, they may tend to oxidize rapidly. In addition, it is preferred that the particles are smaller or equal to the average size of the polymer particles in order that the molten metal can flow around the polymer particle and join with other metal particles Virtually any metal or combination (e.g. alloy) can be used that has a melting point less than about the temperature at which the article is to be molded. The melting point of the metal is preferably low enough to allow flow of the medium during the initial preforming cycles and during the temperature ramping steps. This is critical because the metal particulate should not provide structure to the polymer-metal mixture medium during molding. This would detract from the flowable nature of the medium which is critical to the invention as described below. In fact, in the molten state, the metal tends to act as a lubricant between the individual polymer particles and at the least, does not inhibit the medium flow. Preferred alloys comprising lead, tin, zinc and bismuth actually enhance the flowable nature of the medium. Thus, the heat transfer nature of the polymer mixture is improved without loss of flow properties. Typically, the melting point is below about 140° C. (312° F.) as above that temperature, the metal will provide too much structure during the initial preforming and curing stages. Of course, this will vary with the molding temperature required to mold an article. For example, with 177° C. (350° F.) epoxy resins, the melting point is preferably below about 121° C. (250° F.). For polyimide resins cured at or below 316° C. (600° F.), the metal preferably melts at approximately 171° C. (340° F.).

It is believed the molten metal conforms to the irregular surface of the particulate polymer medium. This results in a continuous film of metal surrounding every polymer particle thereby enhancing the thermal conductivity. It is believed that the metal-medium mixture when hot, is more mobile than the properties of the medium alone in the cold state.

The metal or alloy chosen is also substantially chemically compatible with the polymer chosen. By substantially chemically compatible is meant that it does not accelerate reversion (breakdown) or decomposition of more than about 10% of the polymer medium under the molding temperature used. Reversion refers to the "depolymerization" of the medium to an oily viscous liquid medium or gasification. If the metal is not chemically compatible, excessive destruction of the medium may occur.

In addition, it is especially preferred that the metal or alloy chosen has high thermal conductivity, a low specific heat, a low density, a low melt viscosity and a low surface tension as this combination of properties provides the most desirable metal-medium.

It is preferred that the particulate metal comprises eutectic alloys. Preferred materials include those described in the Table below, however, there are generally many alloys of copper, lead, tin and bismuth that are believed suitable. Many of the pure eutectic metals are available from Atlantic Equipment Engineers (Bergenfield, N.J.).

TABLE

| Metal Matrices | Melting Point | Elements | Ratios |
|---|---|---|---|
| Ternary Eutectic | 95° C. | Bi,Pb,Sn | 52.5:32:15.5 |
| Roses Metal | 109° C. | Bi,Pb,Sn | 50:28:22 |
| Ternary Eutectic | 130° C. | Bi,Sn,Zn | 56:40:4 |
| Binary Eutectic | 140° C. | Bi,Sn | 58:42 |
| Eutectic Solder | 183° C. | Sn,Pb | 63:37 |
| Binary Eutectic | 198° C. | Sn,Zn | 96.5:3.5 |

It is preferred that the mixture of polymer and particulate metal comprises about 20% to about 90% polymer and about 10% to about 80% particulate metal. This is because above about 90% excess metal will squeeze out of the polymer and below about 10% there will be insufficient metal to form the continuous layer necessary for improved heat transfer. The density of the metal used will also affect the degree of "squeeze out". The percentage of metal is dependent on molding pressure as it is believed higher pressures tend to squeeze the metal into thinner layers around the polymer particles. Also, the higher the specific gravity of the metal, the more the metal will tend to stratify, which is not desired. It is especially preferred that if the polymer is the Bi-Pb-Sn ternary eutectic described in the Table above the particulate metal mixture comprises abut 25% to about 60% polymer and about 40% to about 75% particulate metal. The ternary eutectic is useful for low temperature composites (e.g. up to 232° C. (450° F.)). Another preferred material is the eutectic solder described above as it is useful for higher temperatures (e.g. 316° C. (600° F.) to 399° C. (750° F.). Although the mixture has been described in terms of percentage compositions, mixtures that vary from these but provide the advantages described herein may be used.

Depending on the polymer used in the mixture, the polymer and metal may be separated after use facilitating reuse of the polymer as is described in commonly assigned copending application Ser. No. 907,952 now Pat. No. 4,839,392, issued June 13, 1989 entitled "Method for Recovering a Solid Flowable Polymer Medium", the disclosure of which is hereby incorporated by reference. For example, typically the polymer has a specific gravity less than about 1 whereas the metallic particles have a specific gravity greater than about 3. Because of the differential specific gravities a water wash (preferably with detergent in order to float and clean the polymer) effectively separates the polymer from the metal. In most instances, the medium can be immediately reused after suitable drying operations. The reclaimed metal can be reground prior to mixing with clean medium. After cooling, the mixture can be reground for immediate reuse, if it has not contaminated. This facilitates reuse of the materials if they become contaminated.

The polymer medium may also be substantially transparent to UV radiation at the elevated pressures that the polymer containing article precursor is molded. This is useful when the composite is to be cured with UV radiation as described earlier. Substantially transparent as referred to in this application refers to sufficient transparency such that sufficient radiation is transmitted to cure the resin (e.g., activate a UV sensitive catalyst). Typically, this is at least about 10% but varies with many factors (e.g., polymer-media, UV source intensity, pressure, media purity, any entrained gases not removed by vacuum treatment, thickness of the part, etc.). Below about 10%, there is typically not enough intensity to cause curing within a reasonable time frame. It is especially preferred that the transmission is above about 33%. As stated below, UV radiation in particular refers to that portion of the spectrum that is required for the curing of the particular polymer being molded.

The ultraviolet radiation used in the practice of this invention corresponds to that needed to cure the particular polymer that is being molded. This is typically about 200 nm to about 400 nm in wavelength because above about 400 nm, insufficient energy is available to activate the catalyst (initiator) and below about 200 nm, the radiation is outside the range of absorption of conventional photoinitiators (catalysts). It is preferred that it is about 280 nm to about 400 nm since below about 280 nm little, if any, transmission has been observed for the above-described silicone polymers and above about 400 nm, there is little increase in percent transmission.

Generally, the radiation is maintained for under about 10 minutes and for larger throughput under about 10 seconds. However, the exposure time depends upon a variety of factors such as the transparency of the polymer medium, pressure vessel and polymer containing article, the thickness of the article, the type of polymer used in the article and the pressure employed. The elevated pressures referred to above are preferably above about 10 psi because below about 10 psi, the media has not coalesced sufficiently to allow transmission. It is especially preferred that the pressure is above about 20 psi as above that pressure, UV transmission is increased significantly.

The pressure vessel used can be virtually anything that can provide structural support to the polymer medium and/or article. It is required that that portion of the vessel that the UV radiation must pass through to cure the article is substantially transparent to UV radiation, or at least that portion of the UV spectrum that provides the curing. The vessel need not be UV transparent if a U.V. source is disposed within the vessel in proximity to the article. When using transparent vessels, exemplary materials include quartz and acrylic pressure vessels.

It is desirable that the vessel contain mainly the desired polymer medium and the article being molded. However, it will be appreciated that there will be allowed other objects, particles and materials to be contained within the medium. While the material is described as being essentially void-free during molding, such reference is to the absence of spaces between the individual pieces of the medium, and is not a limitation on such occasional voids as may be in the cast or formed polymer piece due to the nature of its manufacture.

The polymer containing article precursors of this invention are preferably composite prepregs. A variety of conventional polymers, and conventional fibers and combinations thereof may be used. Exemplary materials include polyester resins, epoxy resins, silicone resins, vinyl esters, quartz fibers, refractory fibers, and glass fibers.

These article precursors may contain a polymer having an initiator that can be cured upon exposure to UV radiation. The preferable polymers will be those that are susceptible to in-depth UV curing. By in-depth is meant typically about 0.16 cm (0.063 inch) to typically about 7.62 cm (3.0 inch). In addition, the preferable polymers are those susceptible to UV fast cures. By UV fast cures is meant cures that take place in from less than about 1 second to about 2 to 3 minutes. Examples of these polymers include polyesters, vinyl esters, and silicones. The fibers used in composites typically detract from the UV transparent nature of the composite. However, for example, some reflection will occur off of fiber surfaces and aid in-depth curing. Thus exemplary fibers such as quartz, glass and ceramic, etc. when incorporated in resins such as polymer, vinyl ester and silicone do not prohibit the curing. The thickness of the article as well as its composition will determine the UV radiation exposure time needed.

The present invention enables particularly good control over the pressure to which the article is subjected. Because the medium is solid, the article being molded need not be sealed in a manner which is impervious to gas or liquid, greatly alleviating problems with prior art methods such as vacuum bagging. The articles produced are considerably more uniform in properties, especially when of complex shape, compared to articles produced by the prior art method, for example. Because the medium is flowable and allows the mass contained within the pressure vessel to be varied during molding, the method surmounts problems associated with vacuum bagging requirements used in such things as autoclave and hydroclave techniques. For example, there is no loss of articles due to loss of molding pressure because the chamber is completely full of medium. Thus, air cannot enter the system, causing voids or loss of pressure. Material being molded is pulled through the chambers which apply increasing pressure. This debulks the material gradually while it is being drawn through the forming dies during the early part of the cure.

Finally, the UV transparent nature of the polymer medium eliminates the problem of opaque materials within the pressure vessels (e.g., vacuum bags and breather materials) while facilitating the curing of thick structures under high pressures. Thus, this invention makes a significant advance in the field of molding particularly the field of fast cure composite molding.

It should be understood that the invention is not limited to the particular embodiment shown and described herein, but that various changes and modifications may be made without departing from the spirit or scope of this concept as defined by the following claims.

I claim:
1. A method of molding a composite comprising:
 (a) substantially filling a pressure chamber with a solid flowable polymer, said pressure chamber having a series of subchambers separated by a series of spaced apart baffles, said subchambers connected through baffle openings in said baffles;
 (b) displacing said solid flowable polymer through a tube, said tube connecting at least two subchambers, a transferring subchamber and a receiving subchamber, said displacement causing said receiving subchamber to have a higher pressure than said transferring subchamber and said displacement producing a polymer flow in said chamber through said baffle openings from said high pressure receiving subchamber to said low pressure transferring subchamber; and
 (c) passing a composite precursor through said pressure chamber by entering said precursor through said low pressure chamber wherein said composite precursor is exposed to pressure caused by the solid flowable polymer in order to cure the composite.

2. The method of claim 1 wherein the composite precursor is drawn through the pressure chamber.

3. The method of claim 1 wherein said composite precursor is cured by exposure to ultraviolet radiation that passes through said solid flowable medium.

4. The method as recited in claim 1 wherein said composite precursor is cured by exposure to elevated temperatures.

5. The method as recited in claim 4 wherein said heat is transferred to said article precursor at least in part by thermally conductive particulate metal
 (a) that is substantially chemically compatible with said polymer; and
 (b) has a melting point less than about said elevated temperature.

* * * * *

UNITED STATES PATENT AND TRADEMARK OFFICE
CERTIFICATE OF CORRECTION

PATENT NO. : 4,894,190

DATED : January 16, 1990

INVENTOR(S) : Robert V. Kromrey

It is certified that error appears in the above-identified patent and that said Letters Patent is hereby corrected as shown below:

Column 5, line 27, "coalesc" should be --coalesce--.

Signed and Sealed this

Twenty-ninth Day of January, 1991

Attest:

HARRY F. MANBECK, JR.

*Attesting Officer*  *Commissioner of Patents and Trademarks*